Sept. 3, 1929.  J. F. GOTCHY  1,726,822
HYDRAULIC TRANSMISSION
Filed Feb. 20, 1926
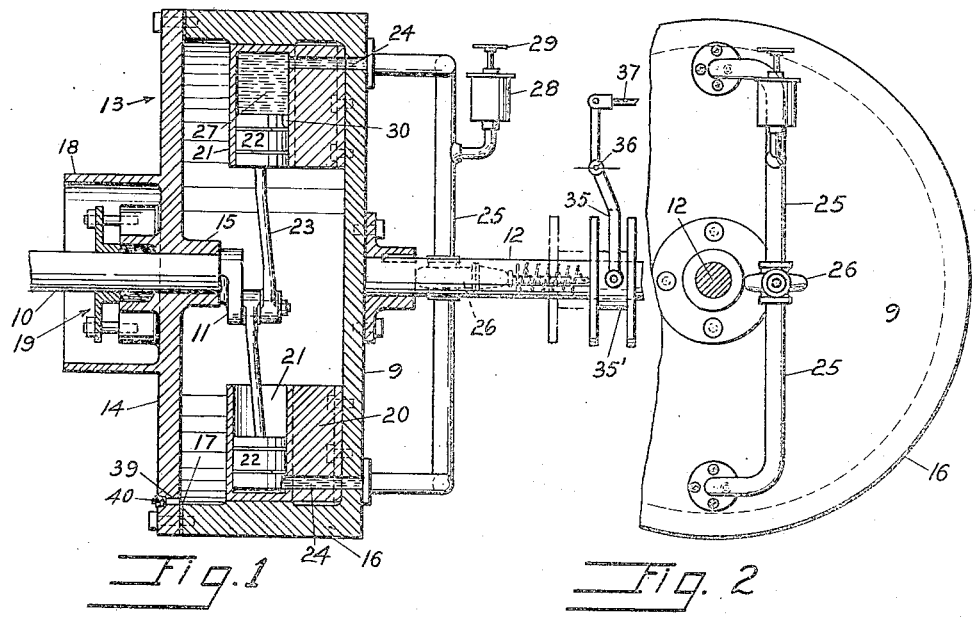
Fig. 1    Fig. 2
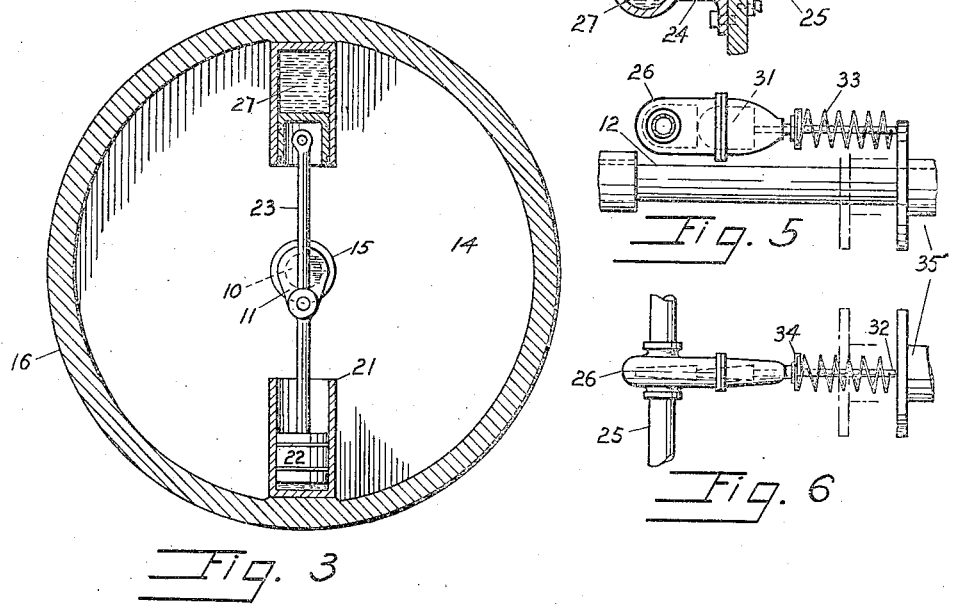
Fig. 3    Fig. 4
         Fig. 5
         Fig. 6
INVENTOR.
Joseph F. Gotchy
BY M. C. Frank
ATTORNEY

Patented Sept. 3, 1929.

UNITED STATES PATENT OFFICE.

JOSEPH F. GOTCHY, OF SAN FRANCISCO, CALIFORNIA, ASSIGNOR OF ONE-THIRD TO ANGELINA M. BEEBE AND ONE-THIRD TO HENRY H. MORTON, BOTH OF SAN FRANCISCO, CALIFORNIA.

HYDRAULIC TRANSMISSION.

Application filed February 20, 1926. Serial No. 89,630.

My invention relates to devices in which a rotary motion is transmitted from one shaft to another shaft aligned therewith, and it has special reference to devices in which such a transmission is accomplished by hydraulic means.

The main object of the invention is to provide a hydraulic transmission in which the reciprocating flow of the liquid medium in its conduits will be retarded and checked, in order to effect the starting and driving of the driven element with the greatest degree of flexibility, and in order that maximum speed variations may be obtained without shocks and jars and without liability of injury to the transmission mechanism or any parts affected by its operation.

A further object of the invention is to reduce the construction of a transmission of this kind to the smallest number of parts, in order to assure ease of operation and to facilitate the installation and the assembling and the disassembling of the transmission and to materially lower the cost of its manufacture.

A still further object of the invention is to provide a transmission that is especially adapted for use in automobiles, motor boats, and other vehicles.

Other objects and advantages will appear from the following detailed description of the invention.

In the accompanying drawings, which illustrate the preferred embodiment of my invention, Figure 1 is a mid-sectional elevation of my improved hydraulic transmission;

Fig. 2 is a broken end view of the transmission, as seen from the right of Fig. 1, the driven shaft being in section;

Fig. 3 is a sectional elevation on the longitudinal center line of the cylinders looking in the direction of the drive shaft;

Fig. 4 is a sectional plan through one of the cylinders and its port;

Fig. 5 is an enlarged plan of the valve and its operating parts and a part of the driven shaft as seen in Fig. 1, the valve being shown in dotted lines in its normal or open position, and the by-pass to the valve being shown in section; and Fig. 6 is a side view of the valve of Fig. 5.

In the drawings my invention is shown as comprising a drive shaft indicated by the numeral 10, provided with a crank 11 at its end, a driven shaft 12 mounted in alignment with the drive shaft, and an element 13 having connected thereto the parts for transmitting a rotary motion from the drive shaft to the driven shaft. The element 13 comprises a cover 14 having integral therewith a hub 15 by means of which the cover is rotatably and concentrically mounted upon the drive shaft, and a cylindrical casing 16 rigidly secured at its open end concentrically to the cover and at its other end rigidly secured to the end of the driven shaft 12, so that the element is thus mounted in concentric relation to both shafts. A gasket 17 may be placed between the casing and the cover in order to form a seal at the joint. On its outer face the cover 14 has integral therewith a brake drum 18 for braking purposes. Within the drum is a suitable stuffing box 19 to establish in conjunction with the hub 15 a sealed bearing for the drive shaft 10.

Blocks 20 are secured within the casing to its flat end wall 9. These blocks are provided with cylinders 21, which are diametrically opposed and open toward each other, and each of the cylinders has therein a fitted piston 22, pivotally connected with the pin on the crank 11 by a rod 23. The bottoms of the cylinders are closed, but each cylinder has therein, preferably adjacent to its bottom, a port 24, which extends through the block 20 and through the end wall 9 of the casing 16, and the two ports 24 are at their outer ends connected by pipes 25, which are suitably secured to the casing and are in communication with each other through connection with an intermediate valve 26.

The space in the cylinders between their flat bottoms and the pistons, as well as the by-pass comprising the ports 24 and the pipes 25, is filled with a liquid medium 27, preferably oil. On one of the pipes 25 is attached an oil cup 28, preferably of the type in which the consumption or the leakage of oil in the cylinders may be compensated for by a plunger adjustable by a hand wheel 29 on the cup. For filling the cylinders and the by-pass with oil, it should be observed that the crank is in one of the positions where the pistons are at a maximum distance from each other, as shown in Figs. 1 and 3, in order that the liquid-filled space may assure the proper working of the transmission, as will presently be explained. In order to prevent a locking of the pistons at dead center there may be a recess 30 formed at the top of each piston toward its respective port 24 in order to facilitate the movement of the pistons. The recess 30 allows the oil to exert a pressure longitudinally of the piston so as to cause movement thereof.

The valve 26 controlling the by-pass is of the type in which a valve 31 is adapted to slide in its housing in order to open or close the ports of the valve. For this purpose the valve is provided with a stem 32, which extends from the valve and is slidable through the housing, and a compression coil-spring 33 is placed around the valve stem and bears at one end against a seat 34 which is part of the stuffing box of the valve, and is with its other end secured to the stem near the end thereof by any suitable means, as for instance, by having its end fitted through a hole adjacent to the end of the stem, as is most clearly shown in Figs. 5 and 6. It is evident by this construction that the spring, bearing against the seat, forces the stem and therewith also the valve away from the pipes 25, so that the valve 26 is thus normally held open.

In the drawings are not shown the framework for the engine, of which the drive shaft 10 is a working part, and the manner in which the shafts 10 and 12 are mounted upon the framework or in relation thereto, as such mountings are readily understood and do not constitute parts of this invention. It is therefore necessary to mention only that, in order to operate the valve 26, a bifurcated lever 35, fulcrumed at a suitable place on the framework or in a fixed relation thereto, as indicated at 36 in Fig. 1, has pivotal connecting means 37, by which an operator may manipulate the lever from a convenient place. This lever 35 is at its bifurcated end operatively connected with a flanged sleeve 35', which is slidably mounted upon the driven shaft 12 and is adapted to bear with its inner flange against the end of the valve stem 32.

For lubrication of the bearing in the hub 15 for the drive shaft 10, and for the connections between the crank 11 and the pistons 22, the element 13 may have therein a suitable liquid lubricant, which is injected into the element or drained therefrom, when so required, through an opening 39 in the cover 14, and a plug 40 is screwed in the opening in order to provide a closure therefor.

When the drive shaft is in operation and the valve 26 is in its normally open position, the inertia of the driven shaft and body to which it is attached and drives, restrains the element 13 so that the drive shaft 10 will rotate in the hub 15, and thus the crank 11 will communicate a reciprocating motion to the pistons 22 in the cylinders 21. This reciprocation of the pistons will cause the liquid 27 to move freely from one cylinder to the other through the by-pass. However, as soon as the operating means 37 is manipulated and motion is thereby communicated to the lever 35 so as to move the flanged sleeve 35' on the driven shaft toward the by-pass, the flange of the sleeve pressing upon the end of the valve stem 32 moves the valve 31 toward its closing position in the valve body, with the result that the flow of the liquid from one cylinder to the other is being slowly obstructed. The liquid flow will thus be retarded so that the element 13 and therewith also the driven shaft and connected members are caused to follow the rotation of the drive shaft but at a slower speed, but when the valve is completely closed so that the liquid is positively prevented from flowing from one cylinder to the other, the liquid will act against the pistons as a solid, so that the inertia of the driven shaft and connected members is fully overcome and the driven shaft therefore is caused to rotate at the same speed as the drive shaft.

It is seen that, by the arrangement and the relation of the parts of the transmission just described, any variation of the speed of the driven shaft may be obtained, and that, in the starting, running and stopping of the transmission, shocks and jars are prevented on account of the flexibility of the hydraulic system of my improved transmission.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, I claim as new and desire to secure by Letters Patent of the United States the following:

1. A hydraulic transmission comprising a drive shaft, a cover comprising a circular plate rotatably mounted upon said drive shaft, a cylindrical casing having an open end secured to said cover, blocks secured to the bottom of said casing, cylinders formed in said blocks having openings concentric to said shaft, a fluid tight transfer passage passing through said blocks and connecting said cylinders, a valve in said passage, pistons connected eccentrically to said drive shaft and making slidable fluid tight connection with the cylinders and a driven shaft fixed to said casing.

2. A hydraulic transmission comprising a drive shaft, a casing rotatably mounted upon said drive shaft, cylinders concentric to said drive shaft within said casing and mounted upon the wall of said casing opposite the drive shaft, pistons for said cylinders eccentrically mounted upon said drive shaft, a fluid tight passage connecting the bottoms of said cylinders, a valve in said passage, an oil reservoir having connection with said passage and a driven shaft fixed to said casing.

3. A hydraulic transmission comprising a drive shaft, a cover comprising a circular plate rotatably mounted upon said drive shaft, a cylindrical casing having an open end secured to said cover, blocks secured to the bottom of said casing, cylinders formed in said blocks having openings concentric to said shaft, a fluid tight transfer passage passing through said blocks and connecting said cylinders, a valve in said passage, pistons connected eccentrically to said drive shaft and making slidable fluid tight connection with the cylinders and a driven shaft fixed to said casing.

In testimony whereof, I affix my signature.

JOSEPH F. GOTCHY.